(12) United States Patent  
Madduri et al.

(10) Patent No.: US 8,930,678 B2  
(45) Date of Patent: Jan. 6, 2015

(54) INSTRUCTION AND LOGIC TO LENGTH DECODE X86 INSTRUCTIONS

(75) Inventors: Venkateswara R. Madduri, Austin, TX (US); Hoichi Cheong, Atlit, TX (US); Jonathan Y. Tong, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 13/457,257

(22) Filed: Apr. 26, 2012

(65) Prior Publication Data

US 2013/0290678 A1    Oct. 31, 2013

(51) Int. Cl.  
*G06F 9/30* (2006.01)

(52) U.S. Cl.  
CPC .................................. *G06F 9/30152* (2013.01)  
USPC ........................................................ 712/208

(58) Field of Classification Search  
None  
See application file for complete search history.

(56) References Cited

U.S. PATENT DOCUMENTS

| | | | | |
|---|---|---|---|---|
| 5,740,392 A | * | 4/1998 | Brennan | 712/210 |
| 5,826,053 A | * | 10/1998 | Witt | 712/210 |
| 5,835,967 A | * | 11/1998 | McMahan | 711/213 |
| 6,105,125 A | * | 8/2000 | Nemirovsky et al. | 712/209 |
| 6,170,051 B1 | * | 1/2001 | Dowling | 712/225 |
| 6,237,074 B1 | * | 5/2001 | Phillips et al. | 711/213 |
| 6,654,872 B1 | * | 11/2003 | Ramesh et al. | 712/204 |
| 2004/0128479 A1 | * | 7/2004 | Madduri et al. | 712/210 |
| 2008/0082893 A1 | * | 4/2008 | Wang | 714/758 |
| 2011/0153987 A1 | * | 6/2011 | Luke et al. | 712/207 |

* cited by examiner

*Primary Examiner* — Eric Coleman  
(74) *Attorney, Agent, or Firm* — Kenyon & Kenyon LLP

(57) ABSTRACT

Techniques to increase the consumption rate of raw instruction bytes within an instruction fetch unit. An instruction fetch unit according to embodiments of the present invention may include a prefetch buffer, a set of bypass multiplexers, an array of bypass latches, a byte-block multiplexer, an instruction alignment multiplexer, a predecode cache, and an instruction length decoder. Raw instruction bytes may be steered from the bypass latches into macro-instructions for consumption by the instruction length decoder, which may generate micro-instructions from the macro-instructions. Embodiments of the present invention may de-couple a latency for reading raw instruction bytes from the prefetch buffer from consuming raw instruction bytes by the instruction length decoder.

24 Claims, 8 Drawing Sheets

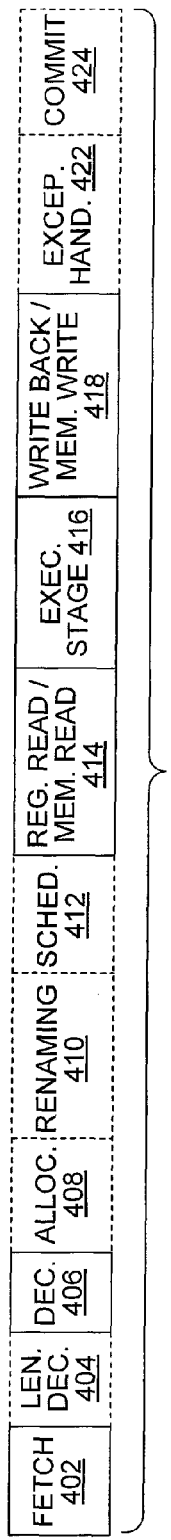
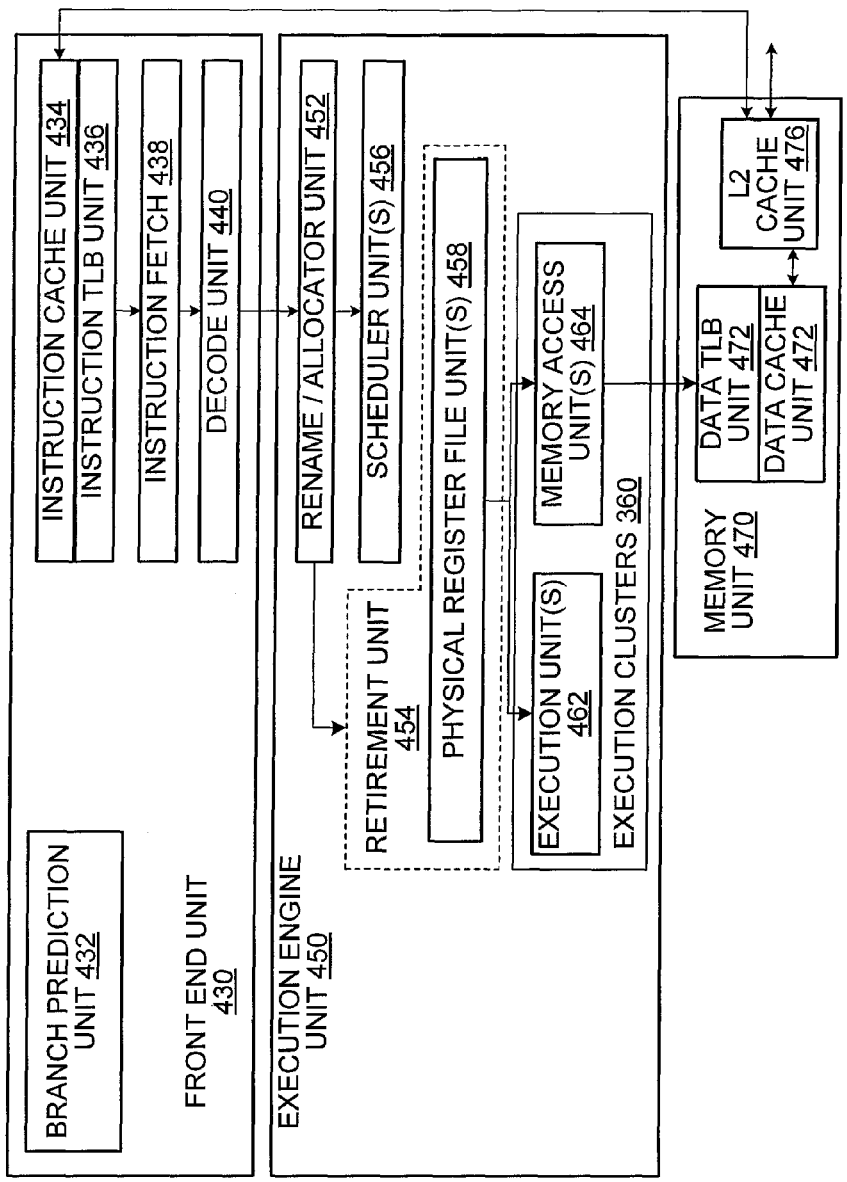
FIG. 4A
FIG. 4B

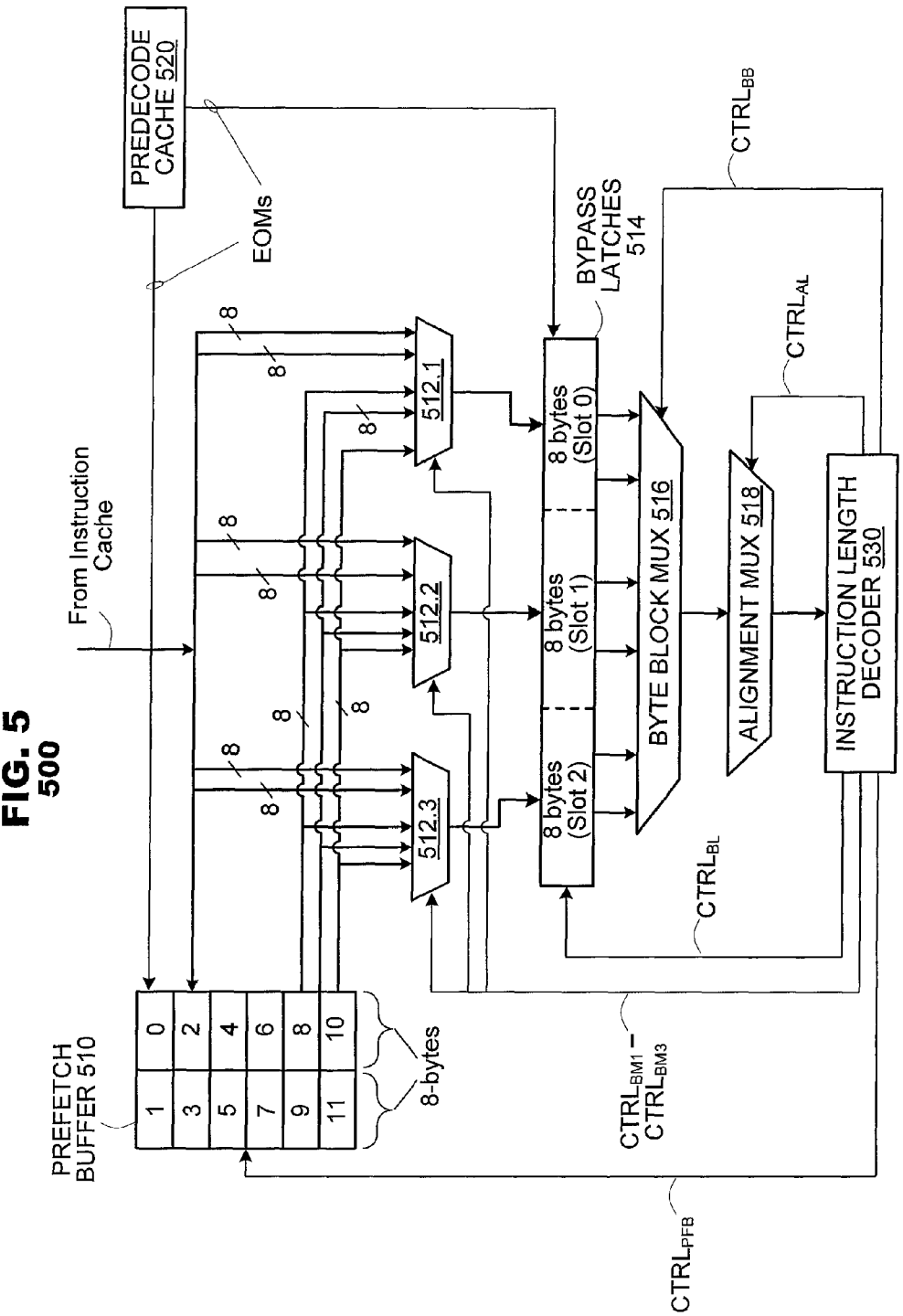

600

700

INSTRUCTION AND LOGIC TO LENGTH DECODE X86 INSTRUCTIONS

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Advances in semi-conductor processing and logic design have permitted an increase in the amount of logic that may be present on integrated circuit devices. As a result, computer system configurations have evolved from a single or multiple integrated circuits in a system to multiple cores that can execute multiple hardware threads in parallel on individual integrated circuits (e.g., individual semiconductor chips). A processor or integrated circuit typically comprises a single physical processor die, where the processor die may include any number of cores, each that can execute a respective hardware thread. The ever increasing number of processing elements (e.g., cores) on integrated circuits enables more tasks to be accomplished in parallel. However, the execution of more threads and tasks put an increased premium on decoding task instructions, and the management thereof.

Typically, an instruction fetch unit reads raw instruction bytes from an instruction cache and stores the bytes in a prefetch buffer. Raw instruction bytes stored in the prefetch buffer are then read by an instruction length decoder. The instruction length decoder prepares macro instructions based on the raw instruction bytes and compares the macro instruction length to a known length for the instruction type to verify proper decoding of the raw instruction bytes. The completion of decoding raw instruction bytes to macro instructions is often referred to as "consumption" of the raw instruction bytes by the instruction length decoder.

The rate at which raw instruction bytes can be consumed by the instruction length decoder is limited by a read latency of the prefetch buffer for reading raw instruction bytes from the prefetch buffer to the instruction length decoder. This creates a bottleneck for consuming raw instruction bytes into the instruction length decoder. The bottleneck, in turn, limits the number of tasks which can be performed by a processor for a given processor clock frequency and therefore increases the power consumption required to perform a given task. In this manner, the consumption of bytes by the instruction length decoder is highly coupled to the read latency of the prefetch buffer.

One solution to overcome this bottleneck would be to increase the clock frequency for reading and consuming bytes from the prefetch buffer. However, this solution does not reduce the read latency of the prefetch buffer, as the latency does not decrease with increased clock frequency.

Accordingly, a need in the art exists to increase the rate at which raw instruction bytes can be consumed by an instruction length decoder.

DESCRIPTION OF THE FIGURES

Embodiments are illustrated by way of example and not limitation in the Figures of the accompanying drawings:

FIG. 4A illustrates elements of a processor micro-architecture according to one embodiment;

FIG. 4B illustrates elements of a processor micro-architecture according to one embodiment;

FIG. 5 illustrates elements of an instruction fetch unit according to one embodiment;

DETAILED DESCRIPTION

Figure 1A:
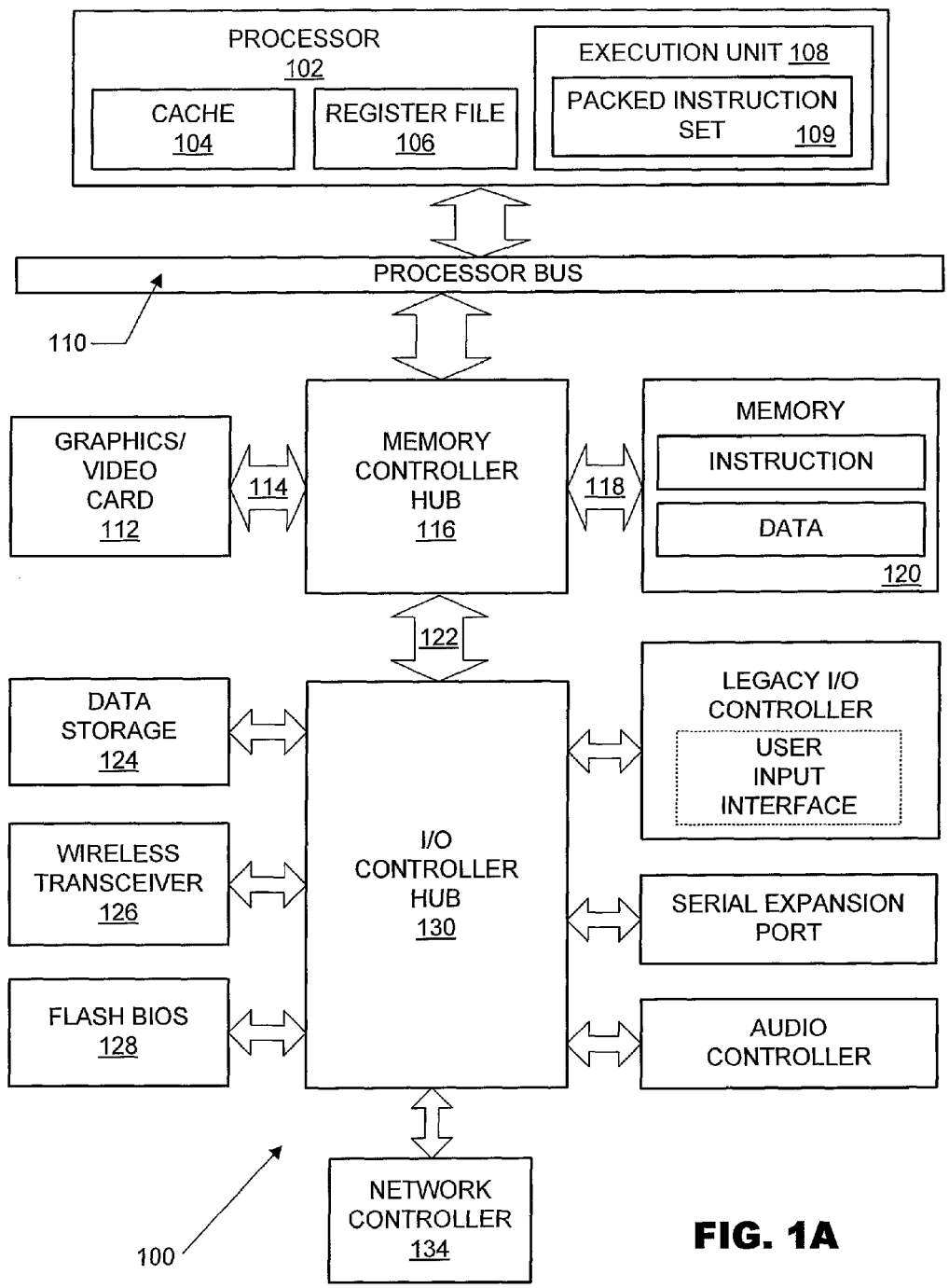
FIG. 1A is a block diagram of a system according to one embodiment.

The following description describes an instruction and processing logic to length decode X86 instructions within or in association with a processor, computer system, or other processing apparatus. In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory ("CD-ROMs"), and magneto-optical disks, Read-Only Memory ("ROMs"), Random Access Memory ("RAM"), Erasable Programmable Read-Only Memory ("EPROM"), Electrically Erasable Programmable Read-Only Memory ("EEPROM"), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output ("I/O").

In one embodiment, the instruction set architecture ("ISA") may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table ("RAT"), a Reorder Buffer ("ROB") and a retirement register file). In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data ("SIMD") refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions ("SSE"), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology ("ICT") of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants ("PDAs"), and handheld PCs. Embedded applications can include a micro controller, a digital signal processor ("DSP"), system on a chip, network computers ("NetPC"), set-top boxes, network hubs, wide area network ("WAN") switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 ("L1") internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode ("ucode") ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory ("DRAM") device, a static random access memory ("SRAM") device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub ("MCH"). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port ("AGP") interconnect 114.

System 100 uses a proprietary hub interface bus 122 to couple the MCH 116 to the I/O controller hub ("ICH") 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
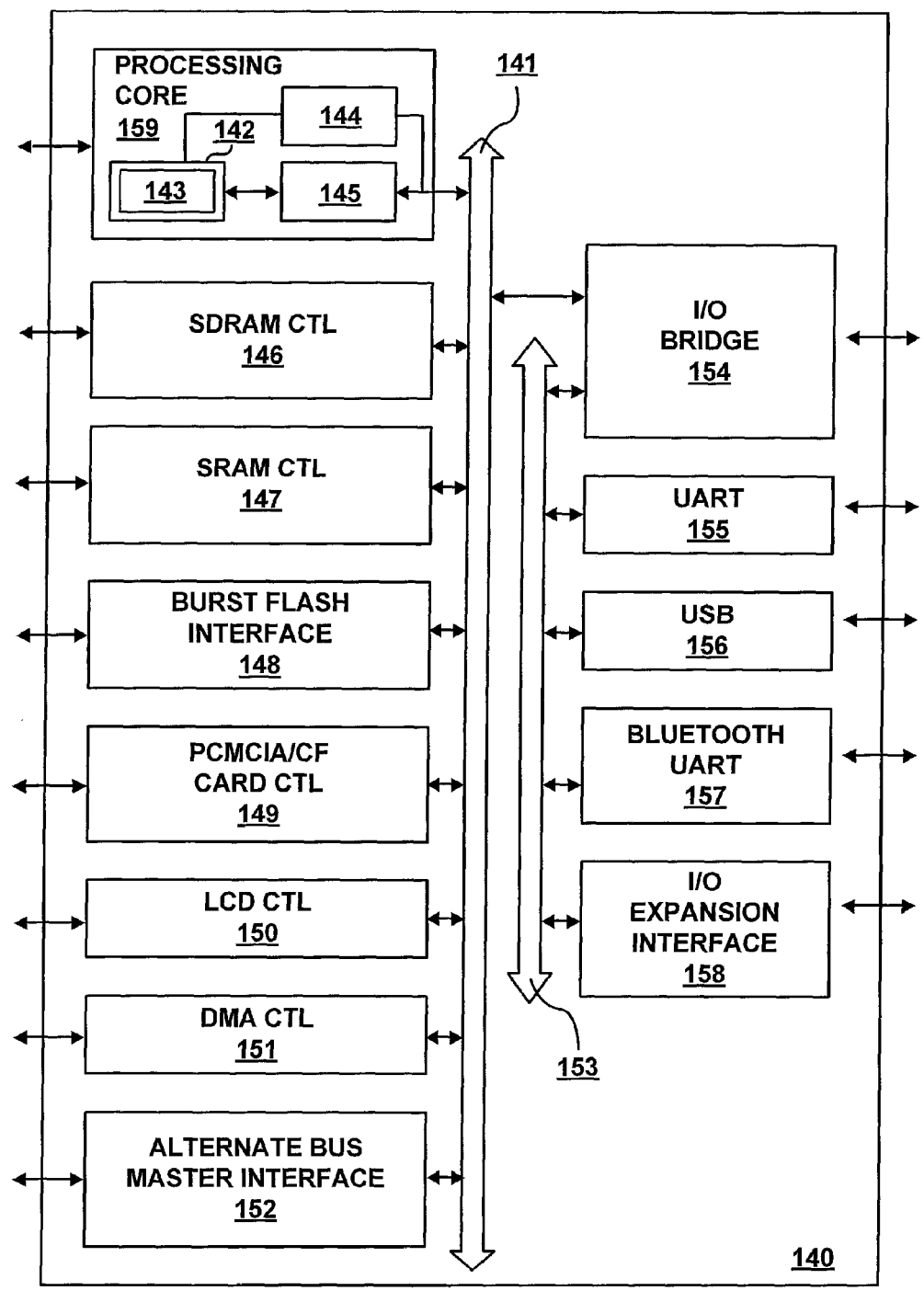
FIG. 1B illustrates a data processing system according to one embodiment.

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention.

Computer system 140 comprises a processing core 159 capable of performing at least one instruction in accordance with one embodiment. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions.

Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory ("SDRAM") control 146, static random access memory ("SRAM") control 147, burst flash memory interface 148, personal computer memory card international association ("PCMCIA")/compact flash (CF) card control 149, liquid crystal display ("LCD") control 150, direct memory access ("DMA") controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter ("UART") 155, universal serial bus ("USB") 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform ("FFT"), a discrete cosine transform ("DCT"), and their respective inverse transforms; compression/decompression techniques such as color space transformation, video encode motion estimation or video decode motion compensation; and modulation/demodulation ("MODEM") functions such as pulse coded modulation ("PCM").

Figure 2:
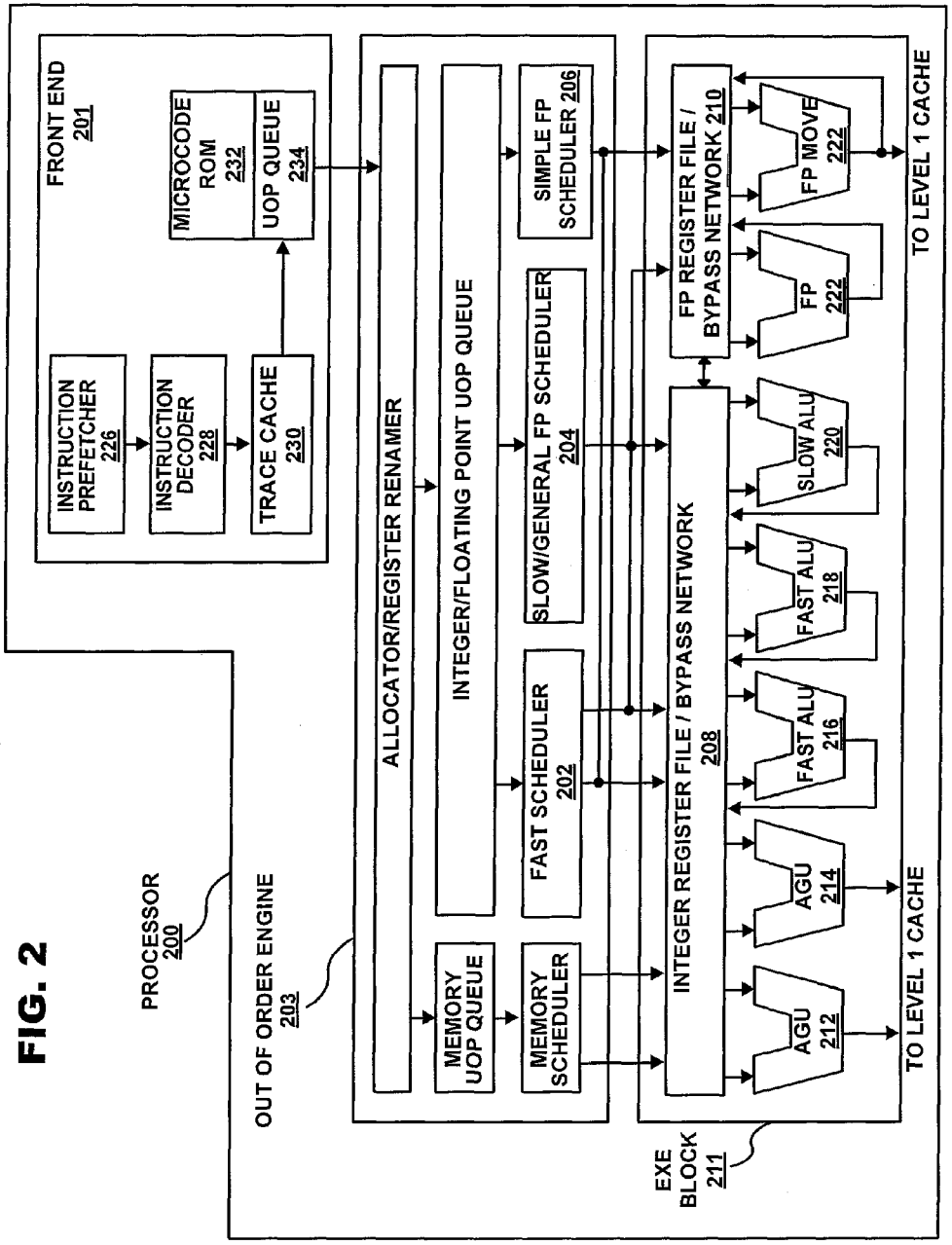
FIG. 2 is a block diagram of a processor according to one embodiment.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called "micro op" or "UOPs") that the machine can execute. In one embodiment, the instruction decoder 228 may include an instruction length decoder, which may perform length verification on the UOPs prior to execution. In other embodiments, the decoder parses the instruction into an opcode and corresponding data and control fields that are used by the micro-architecture to perform operations in accordance with one embodiment. In one embodiment, the trace cache 230 takes decoded UOPs and assembles them into program ordered sequences or traces in the UOP queue 234 for execution. When the trace cache 230 encounters a complex instruction, the microcode ROM 232 provides the UOPs needed to complete the operation.

Some instructions are converted into a single UOP, whereas others need several UOPs to complete the full operation. In one embodiment, if more than four UOPs are needed to complete a instruction, the decoder 228 accesses the microcode ROM 232 to do the instruction. For one embodiment, an instruction can be decoded into a small number of UOPs for processing at the instruction decoder 228. In another embodiment, an instruction can be stored within the microcode ROM 232 should a number of UOPs be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing UOPs for an instruction, the front end 201 of the machine resumes fetching UOPs from the trace cache 230.

The out-of-order execution engine 203 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each UOP needs in order to execute. The register renaming logic renames logic registers onto entries in a register file. The allocator also allocates an entry for each UOP in one of the two UOP queues, one for memory operations and one for non-memory operations, in front of the instruction schedulers: memory scheduler, fast scheduler 202, slow/general floating point scheduler 204, and simple floating point scheduler 206. The UOP schedulers 202, 204, 206, determine when a UOP is ready to execute based on the readiness of their dependent input register operand sources and the availability of the execution resources the UOPs need to complete their operation. The fast scheduler 202 of one embodiment can schedule on each half of the main clock cycle while the other schedulers can only schedule once per main processor clock cycle. The schedulers arbitrate for the dispatch ports to schedule UOPs for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent UOPs. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit ("AGU") 212, AGU 214, fast arithmetic logic unit ("ALU") 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the UOPs schedulers 202, 204, 206, dispatch dependent operations before the parent load has finished executing. As UOPs are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3A:
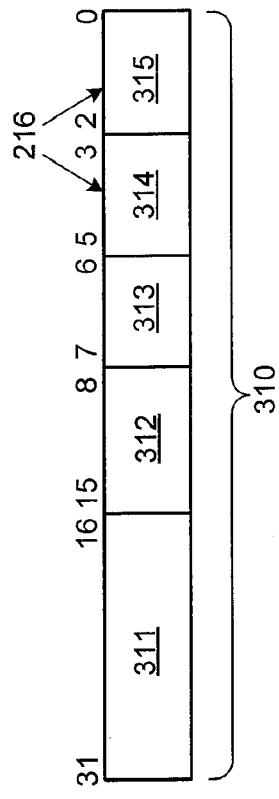
FIG. 3A illustrates an instruction encoding according to one embodiment.

FIG. 3A is a depiction of one embodiment of an operation encoding (opcode) format 310, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, an instruction may be encoded by one or more of fields 311 and 312. Up to two operand locations per instruction may be identified, including up to two source operand identifiers 314 and 315. For one embodiment, destination operand identifier 316 is the same as source operand identifier 314, whereas in other embodiments they are different. For an alternative embodiment, destination operand identifier 316 is the same as source operand identifier 315, whereas in other embodiments they are different. In one embodiment, one of the source operands identified by source operand identifiers 314 and 315 is overwritten by the results of the text string comparison operations, whereas in other embodiments identifier 314 corresponds to a source register element and identifier 315 corresponds to a destination register element. For one embodiment, operand identifiers 314 and 315 may be used to identify 32-bit or 64-bit source and destination operands.

Figure 3B:
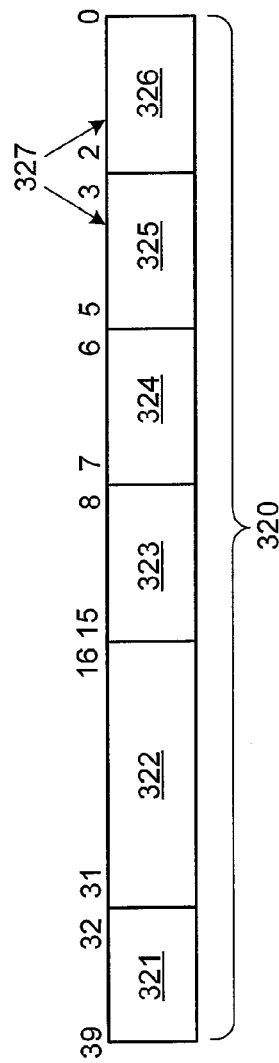
FIG. 3B illustrates an instruction encoding according to one embodiment.

FIG. 3B is a depiction of another alternative operation encoding (opcode) format 320, having forty or more bits. Opcode format 320 corresponds with opcode format 320 and comprises an optional prefix byte 321. An instruction according to one embodiment may be encoded by one or more of fields 321, 322, and 323. Up to two operand locations per instruction may be identified by source operand identifiers 324 and 325 and by prefix byte 321. For one embodiment, prefix byte 321 may be used to identify 32-bit or 64-bit source and destination operands. For one embodiment, destination operand identifier 327 is the same as source operand identifier 325, whereas in other embodiments they are different. For an alternative embodiment, destination operand identifier 327 is the same as source operand identifier 326, whereas in other embodiments they are different. In one embodiment, an instruction operates on one or more of the operands identified by operand identifiers 325 and 326 and one or more operands identified by the operand identifiers 325 and 326 is overwritten by the results of the instruction, whereas in other embodiments, operands identified by identifiers 325 and 326 are written to another data element in another register. Opcode formats 310 and 320 allow register to register, memory to register, register by memory, register by register, register by immediate, register to memory addressing specified in part by MOD fields 313 and 324 and by optional scale-index-base and displacement bytes.

Figure 3C:
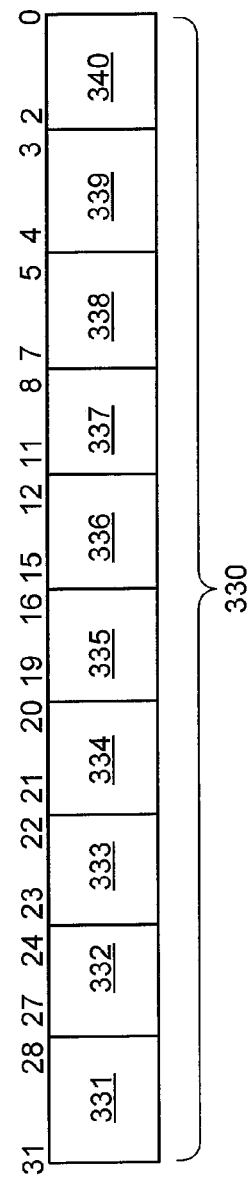
FIG. 3C illustrates an instruction encoding according to one embodiment.

Turning next to FIG. 3C, in some alternative embodiments, 64 bit single instruction multiple data ("SIMD") arithmetic operations may be performed through a coprocessor data processing ("CDP") instruction. Operation encoding (opcode) format 330 depicts one such CDP instruction having CDP opcode fields 332 and 339. The type of CDP instruction, for alternative embodiments, operations may be encoded by one or more of fields 333, 334, 337, and 338. Up to three operand locations per instruction may be identified, including up to two source operand identifiers 335 and 340 and one destination operand identifier 336. One embodiment of the coprocessor can operate on 8, 16, 32, and 64 bit values. For one embodiment, an instruction is performed on integer data elements. In some embodiments, an instruction may be executed conditionally, using condition field 331. For some embodiments, source data sizes may be encoded by field 333. In some embodiments, Zero (Z), negative (N), carry (C), and overflow (V) detection can be done on SIMD fields. For some instructions, the type of saturation may be encoded by field 334.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing ("RISC") core, a complex instruction set computing ("CISC") core, a very long instruction word ("VLIW") core, or a hybrid or alternative core type. As yet another option, the core 490 may be a special-purpose core, such as, for example, a network or communication core, compression engine, graphics core, or the like.

The front end unit 430 may include a branch prediction unit 432 coupled to an instruction cache unit 434, which is coupled to an instruction translation lookaside buffer ("TLB") 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays ("PLAs"), microcode read only memories ("ROMs"), etc. The instruction cache unit 434 is further coupled to a level 2("L2") cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/ vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/ memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5 illustrates elements of an instruction fetch unit 500 according to one embodiment of the present invention. As illustrated in FIG. 5, the instruction fetch unit 500 may include: a prefetch buffer ("PFB") 510, a set of bypass multiplexers ("MUXs") 512.1-512.3, an array of bypass latches 514, a byte-block MUX 516, an instruction alignment MUX 518, a predecode cache 520, and an instruction length decoder 530. The instruction fetch unit 500 may read raw instruction bytes from an instruction cache. The raw instruction bytes may be steered from the bypass latches 514 into macro-instructions for consumption by the instruction length decoder 530, which may generate UOPs from the macro-instructions.

The bypass latches 514 may provide a queue for raw instruction bytes for consumption by the instruction length decoder 530. Raw instruction bytes may be stored in the bypass latches either from the instruction cache or from the PFB 510. The instruction fetch unit 500 as configured according to embodiments of the present invention may de-couple the read latency of the PFB 510 from the consumption of raw instruction bytes by the instruction length decoder 530. Thus, the instruction fetch unit 500 according to embodiments of the present invention may provide for increased raw instruction decoding rates.

Macro-instructions may be packed across 16 byte blocks of raw instruction bytes and may be of variable length from 1 byte to 15 bytes. Each 16 byte raw instruction block may be divided into 8 "upper" bytes and 8 "lower" bytes. A macro-instruction may begin within a first 4 byte sub-block of a given 16 byte raw instruction block and may end either within the given 16 byte block or within a subsequent 16 byte block. The 16 byte blocks of raw instructions may include multiple macro-instructions.

In one embodiment, the PFB 510 may include an array of memory locations to store 16 byte blocks of raw instructions. For example, as illustrated in FIG. 5, the PFB 510 may include an array of six, 16 byte memory locations, which may be divided into 8 byte slots for storing the lower and upper 8 bytes of a 16 byte block (i.e., a memory location labeled "0" may store 8 lower bytes and a memory location labeled "1" may store 8 upper bytes of a first 16 byte block stored in the PFB 510). Raw instruction bytes may be read from the PFB 510 for storage in the bypass latches 514 before they may be consumed by the instruction length decoder 530. A read pointer may be maintained by the PFB 510, which may be advanced as raw instruction bytes may be consumed from the PFB 510 via the bypass latches 514 and the instruction length decoder 530. Memory locations within the PFB 510 from which the bytes are read may also be de-allocated upon consumption. The PFB 510 read pointer may be reset when all raw instruction bytes may be consumed from the PFB 510 (i.e., raw instruction bytes consumed from memory locations 10 and 11). The decoder 530 may provide a control signal $CTRL_{PFB}$ to the PFB 510 to manage the read pointer and de-allocation of memory locations.

The bypass latches 514 may provide 24 bytes of raw instruction storage. Raw instruction bytes may be written to the bypass latches 514 from either the PFB 510 or the instruction cache in 8 byte blocks, shown here as "Slot 0-2." Raw instruction bytes may be read from the bypass latches 514 for consumption by the instruction length decoder 530. A read pointer may be maintained for the bypass latches 514, which may be advanced as raw instruction bytes may be read from the latches 514 and consumed by the instruction length decoder 530. The decoder 530 may provide a control signal $CTRL_{BL}$ to the bypass latches 514 to manage the read pointer.

The decoder 530 may control the bypass MUXs 512.1-512.3 to steer raw instruction bytes from memory locations of the PFB 510 and/or the instruction cache for storage within the bypass latches 514. The decoder 530 may provide control signals $CTRL_{BM1}$-$CTRL_{BM3}$ to control corresponding bypass MUXs 512.1-512.3 to direct raw instruction bytes from memory locations of the PFB 510 and/or the instruction cache into the bypass latches 514.

As raw instruction bytes may be written into the PFB 510 from the instruction cache, the predecode cache 520 may insert an end of instruction marker ("EOM") into the 16 byte blocks, which may indicate the end of a macro instruction within the raw instruction blocks. As raw instruction bytes may be written into the bypass latches 514 from the instruction cache, the predecode cache 520 may insert an EOM into an appropriate 8 byte block, which may indicate the end of a macro-instruction within an 8 byte block. In an embodiment, the EOM may be a bit that may indicate the end of a macro-instruction.

Raw instruction bytes stored in the bypass latches 514 may be read from the bypass latches 514 and steered into macro-instructions through the byte block MUX 516 and the instruction alignment MUX 518. Control of the instruction alignment MUX 518 may align a beginning of each macro-instruction for consumption by the instruction length decoder 530. The instruction length decoder 530 may provide a control signal $CTRL_{BB}$ to the byte block MUX 516 and a control signal $CTRL_{AM}$ to the alignment MUX 518 to steer raw bytes read from the bypass latches 514 into macro-instructions using corresponding EOMs for each macro-instruction.

Under various operating conditions, raw instruction bytes read from the instruction cache may be written to both the PFB 510 and to the bypass latches 514. For example, when the PFB 510 may be empty, a first 16 byte raw instruction block may be written to both the PFB 510 and the bypass latches 514. A first 8 lower bytes from the first 16 byte block may be stored in Slot 0 of the bypass latches 514, and a first 8 upper bytes may be stored in Slot 1. For a second 16 byte raw instruction block, 8 lower bytes of the block may be written to both the PFB 510 and the bypass latches 514, while 8 upper bytes of the block may be written only to the PFB 510. The 8 lower bytes of the second 16 byte raw instruction block may be stored in Slot 2 of the bypass latches 514.

Operation of the instruction fetch unit 500 may be pipelined to read/write raw instruction bytes from the instruction cache, steer the raw instructions into macro-instructions, and decode the macro-instructions into UOPs. Operations for writing raw instruction bytes to the PFB 510 and/or the bypass latches 514 as well as operations for reading raw instruction bytes from the PFB 510 to write to the bypass latches 514 may be de-coupled from macro-instruction steering and decoding operations performed by the instruction length decoder 530.

For example, upon storing 8 upper and lower bytes from a first 16 byte block, the instruction length decoder 530 may begin to steer the raw instruction bytes into macro-instructions based on an EOM for each macro-instruction. The raw instruction bytes may be read from the bypass latches 514, steered into macro-instructions via the byte block MUX 516 and instruction alignment MUX 518, and decoded into UOPs within the instruction length decoder 530.

The instruction length decoder 530 may perform an instruction length check to verify an expected instruction length for the UOPs. The expected instruction length may be computed based on the number of raw instruction bytes present after the alignment MUX 518 and certain machine states. In an embodiment, the length decoder 530 may step through the raw instruction bytes pseudo-sequentially to generate a true length for each instruction. If the instruction length is incorrect, the decoder 530 may control the PFB 510 to re-write the 8 byte block(s) including the macro-instruction (s) to the bypass latches 514 and may repeat the macro-instruction steering and decoding operations. Further, for a failed instruction length check, the read pointers for the PFB 510 and the bypass latches 514 may be decremented to the beginning of the 8 byte block which failed the length check.

If the instruction length is correct, the instruction length decoder 530 may generate the UOPs for further decoding by an instruction decode unit (i.e., decode unit 440 of FIG. 4B). Upon verification of the UOP length, the macro-instruction may be considered consumed by the instruction length decoder 530. The instruction length decoder 530 may advance the corresponding read pointers for the bypass latches 514 and the PFB 510 and a memory location within each of the PFB 510 and the bypass latches 514 which contained the 8 byte block may be de-allocated. A subsequent 8 byte block may be written from the PFB 510 into the de-allocated memory location of the bypass latches 514. The write into the bypass latches 514 may occur concurrently with steering/decoding operations performed by the instruction length decoder 530 on 8 byte raw instruction blocks already present in the bypass latches 514. After macro-instructions may be consumed from an 8 byte block of raw instructions in Slot 2 of the bypass latches 514, the read pointer for the bypass latches 514 may be reset to the beginning of Slot 0 for further raw instruction byte decoding.

The instruction fetch unit 500 may operate in this manner, populating the bypass latches 514 with raw instruction bytes from the PFB 510, and steering/decoding macro-instruction bytes from the bypass latches 514 by the instruction length decoder 530 until all raw instruction byte blocks may be consumed from the PFB 510. Upon consumption of all raw instruction byte blocks from the PFB 510, the instruction fetch unit 500 may fetch more raw instruction bytes from the instruction cache.

In one embodiment, multiple instruction fetch units 500 may be replicated for multiple processing threads, thereby improving instruction length decoding efficiency and reducing power consumption for each processing thread. In one embodiment, the instruction length decoder 530 may decode raw instruction bytes from the bypass latches at a clock frequency higher than a clock frequency for reading raw instruction bytes from the PFB 510. In one embodiment, the bypass latches 514 may be gated when raw instruction bytes may be available for decoding from the bypass latches 514. In various embodiments, the bypass latches 514 may also store control information such as branch prediction information and flow encodings.

Figure 6:
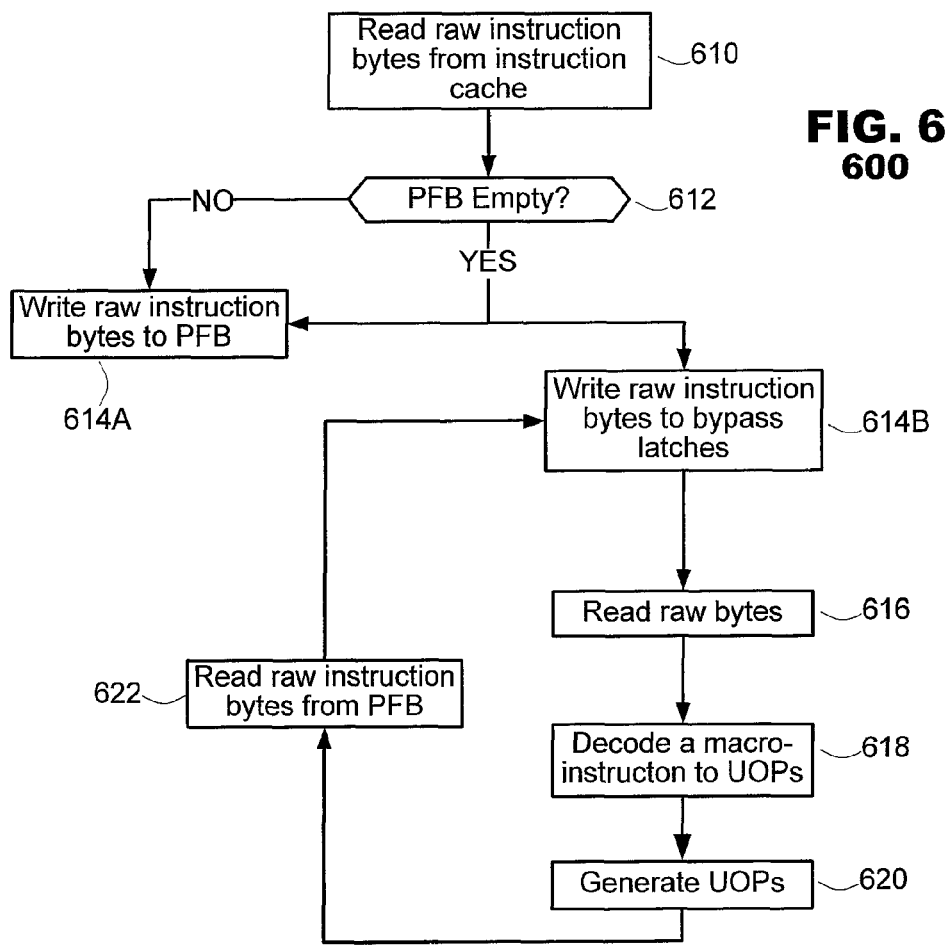
FIG. 6 illustrates a flow diagram of a process for an instruction length decode according to one embodiment.

FIG. 6 illustrates a flow diagram of a process 600 for instruction length decoding according to one embodiment of the present invention. As illustrated in FIG. 6, the process 600 may read raw instruction bytes from an instruction cache (block 610). The process may determine if a prefetch buffer ("PFB") is empty (block 612). If the PFB is empty, the raw instruction bytes may be written to the PFB (block 614A) and to a set of bypass latches (block 614B). If the PFB is not empty, the raw instruction bytes may be written to the PFB (block 614B). As noted, the raw instruction bytes may be contained in 16 byte blocks. In an embodiment, an end of instruction marker may be inserted into the PFB and/or the bypass latches for raw instruction bytes read from the instruction cache to indicate an end of for each macro-instruction.

The process 600 may consume raw instruction bytes from the bypass latches for generating micro-instructions. At block 616, the process 600 may read raw instruction bytes from the bypass latches. The process 600 may decode a macro-instruction from the raw instruction bytes into a plurality of UOPs (block 618). At block 620, the process may generate the UOPs for further processing. For example, the UOPs may be processed by an external decode unit for executing the micro-instructions. At block 622, the process 600 may read another block of raw instruction bytes from the PFB and write the raw instruction bytes to the bypass latches (return to block 614B). The process 600 may continue consuming raw instruction bytes from the bypass latches until all raw instruction bytes may be consumed from the PFB.

Figure 7:
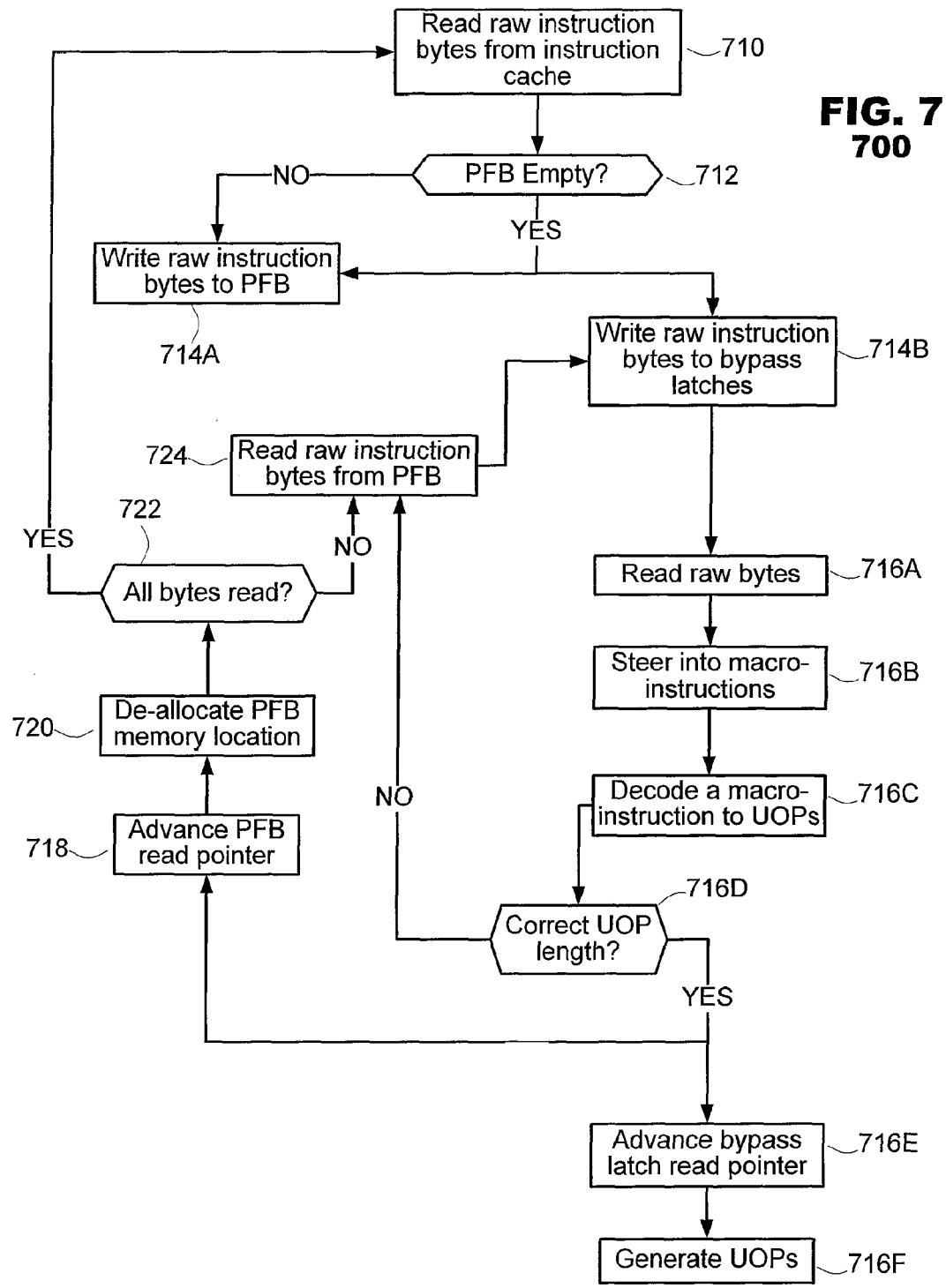
FIG. 7 illustrates a flow diagram of a process for an instruction length decode according to one embodiment.

FIG. 7 illustrates a flow diagram of a process 700 for instruction length decoding according to one embodiment of the present invention. As illustrated in FIG. 7, the process 700 may read raw instruction bytes from an instruction cache (block 710). The process may determine if a prefetch buffer ("PFB") is empty (block 712). If the PFB may be empty, the raw instruction bytes may be written to the PFB (block 714A) and to a set of bypass latches (block 714B). If the PFB is not empty, the raw instruction bytes may be written to the PFB (block 714B). In an embodiment, an end of instruction marker may be inserted into the PFB and/or the bypass latches for raw instruction bytes read from the instruction cache to indicate an end for each macro-instruction.

The process 700 may consume raw instruction bytes from the bypass latches for generating micro-instructions. At block 716A, the process 700 may read raw instruction bytes from the bypass latches. The process may steer the raw instruction bytes into macro-instructions (block 716B). In one embodiment, the steering may include determining a start and end of a macro-instruction based on an end of instruction marker for each macro-instruction and aligning to the beginning of each macro-instruction for decoding. At block 716C, the process 700 may decode the macro-instructions into UOPs.

The process 700 may determine if the decoded UOPs are a correct length (block 716D). For example, the process 700 may calculate an expected length for the UOPs based on the raw instruction bytes present and certain machine states. The process may compare the expected length to the length of the UOPs to determine if the UOPs are a correct length. If the length is incorrect, the process may re-read the raw instruction bytes from the PFB (block 724) and re-write them into the bypass latches (block 714B). If the length is correct, the process may advance a bypass latch read pointer (block 716E) and may advance a PFB read pointer (block 718). At block 716F, the process 700 may generate the UOPs for further processing. For example, the UOPs may be processed by an external decode unit for executing the micro-instructions.

The process 700 may also advance the PFB read pointer (block 718) if the UOP length may be correct. The PFB read pointer may be advanced to a base address for the PFB if all raw instruction bytes have been read from the PFB. At block 720, the process may de-allocate memory from the PFB for the consumed raw instruction bytes. At block 722, the process may check the PFB read pointer location to determine if all raw instruction bytes have been read from the PFB. If so, the process may return to reading raw instruction bytes from the instruction cache (return to block 710). Otherwise, the process may read another block of raw instruction bytes from the PFB (block 724) and write the block into the bypass latches (block 714B).

The process 700 may operate in a looping manner to consume all raw instruction bytes from the PFB. Thus, operations for consuming raw instruction bytes (e.g., blocks 716A-716F) may be de-coupled from reading raw instruction bytes from the PFB (e.g., block 724) and writing raw instruction bytes into the bypass latches (e.g., block 714B).

Embodiments of the present invention involve an improved instruction fetch unit to length decode X86 instructions.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories ("CD-ROMs"), compact disk rewritable's ("CD-RWs"), and magneto-optical disks, semiconductor devices such as read-only memories ("ROMs"), random access memories ("RAMs") such as dynamic random access memories ("DRAMs"), static random access memories ("SRAMs"), erasable programmable read-only memories ("EPROMs"), flash memories, electrically erasable programmable read-only memories ("EEPROMs"), magnetic or optical cards, or any other type of media suitable for storing electronic instructions.

Accordingly, embodiments of the invention also include non-transitory, tangible machine-readable media containing instructions or containing design data, such as Hardware Description Language ("HDL"), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A system, comprising:
a hardware processor to execute computer instructions stored therein, the processor including:
a first hardware storage structure to receive raw instruction bytes from an instruction cache;
a second hardware storage structure to receive raw instruction bytes from the first storage structure and from the instruction cache;
logic to consume the raw instruction bytes from the second storage structure to generate micro-instructions;
logic to read the raw instruction bytes from the first storage structure for writing into the second storage structure;
logic to determine a length of the micro-instructions; and
logic to compare the determined length to an expected length,
wherein if the determined length is equal to the expected length,
de-allocating a memory location from the first storage structure corresponding to the consumed raw instruction bytes, and
if the determined length is not equal to the expected length,
reading raw instruction bytes corresponding to the micro-instructions of the determined length from the first storage structure and re-writing into memory locations in the second storage structure corresponding to the micro-instructions of the determined length.

2. The system of claim 1, further comprising logic to insert marker bits in the first and second storage structures for the raw instruction bytes stored from the instruction cache.

3. The system of claim 1, wherein the first storage structure includes a read pointer.

4. The system of claim 2, further comprising logic to advance the first storage structure when the raw instruction bytes are consumed to generate micro-instructions.

5. The system of claim 1, wherein the second storage structure includes a read pointer.

6. The system of claim 5, further comprising logic to advance the second storage structure read pointer when the raw instruction bytes are consumed to generate micro-instructions.

7. The system of claim 1, wherein the first and second storage structures, the logic to consume the raw instruction bytes, and the logic to read the raw instruction bytes from the first storage structure are replicated for a plurality of processing threads within the processor.

8. A processor, comprising:
a hardware prefetch buffer to store raw instruction bytes from an instruction cache;
a plurality of first multiplexers;
a plurality of bypass latches to store raw instruction bytes from the prefetch buffer and from the instruction cache;
a second multiplexer to determine a beginning of a macro-instruction;
a third multiplexer to align a macro-instruction to be length decoded; and
an instruction length decoder to length decode a macro-instruction into micro-instructions,
wherein the instruction length decoder determines a length of the micro-instructions;
and compares the determined length to an expected length,
wherein if the determined length is equal to the expected length,
de-allocating a memory location from the prefetch buffer corresponding to the consumed raw instruction bytes, and
if the determined length is not equal to the expected length,
reading raw instruction bytes corresponding to the micro-instructions of the determined length from the prefetch buffer and re-writing into memory locations in the bypass latches corresponding to the micro-instructions of the determined length.

9. The processor of claim 8, wherein the prefetch buffer includes a read pointer to advance when macro-instructions are decoded by the instruction length decoder.

10. The processor of claim 8, wherein the bypass latches include a read pointer to advance when raw instruction bytes are read from the bypass latches.

11. The processor of claim 8, wherein raw instruction bytes are stored in the prefetch buffer in 16 byte blocks.

12. The processor of claim 11, wherein the prefetch buffer includes storage for six of the 16 byte raw instruction blocks.

13. The processor of claim 8, wherein the bypass latches include storage for 24 bytes of raw instructions.

14. A non-transitory machine-readable medium having stored thereon instructions for causing a processor to execute a method for performing instruction length decoding, the method comprising:
 reading raw instruction bytes from an instruction cache;
 determining if a prefetch buffer is empty;
 if the prefetch buffer is empty, storing the raw instruction bytes in the prefetch buffer and a plurality of bypass latches, and
 if the prefetch buffer is not empty, storing the raw instruction bytes in the prefetch buffer;
 consuming the raw instruction bytes, comprising:
  reading raw instruction bytes from the bypass latches,
  decoding a macro-instruction from the raw instruction bytes into a plurality of micro-instructions,
  wherein each macro-instruction includes an end of instruction marker, and
  generating the micro-instructions;
 reading raw instruction bytes from the prefetch buffer for storage in the bypass latches;
 determining a length of the plurality of micro-instructions;
 comparing the determined length to an expected length;
 if the determined length is equal to the expected length, de-allocating a memory location from the prefetch buffer corresponding to the consumed raw instruction bytes, and
 if the determined length is not equal to the expected length, reading raw instruction bytes corresponding to the micro-instructions of the determined length from the prefetch buffer and re-writing into memory locations in the bypass latches corresponding to the micro-instructions of the determined length; and
 repeating the consuming the raw instruction bytes.

15. The non-transitory machine-readable medium of claim 14, the storing raw instruction bytes in the prefetch buffer further comprising inserting end of instruction markers into the prefetch buffer.

16. The non-transitory machine-readable medium of claim 15, wherein each end of instruction marker identifies an end of a macro-instruction within the raw instruction bytes.

17. The non-transitory machine-readable medium of claim 14, wherein the raw instruction bytes are stored in the prefetch buffer 16 byte raw instruction blocks.

18. The non-transitory machine-readable medium of claim 17, wherein the 16 byte raw instruction blocks are stored in the bypass latches in 8 byte blocks.

19. The non-transitory machine-readable medium of claim 14, wherein 24 bytes of raw instructions are stored in the bypass latches.

20. The non-transitory machine-readable medium of claim 14, the storing raw instruction bytes in the bypass latches further comprising inserting end of instruction markers into the bypass latches.

21. The non-transitory machine-readable medium of claim 20, wherein each end of instruction of instruction marker identifies an end of a macro-instruction within the raw instruction bytes.

22. The non-transitory machine-readable medium of claim 14, the consuming raw instruction bytes further comprising:
 steering the read raw instruction bytes into macro-instructions based on the end of instruction marker for each macro-instruction; and
 aligning to the beginning of each macro-instruction for decoding each macro-instruction.

23. The non-transitory machine-readable medium of claim 14, wherein the expected length is computed based on a number of macro instructions in the raw instruction bytes.

24. The non-transitory machine-readable medium of claim 14, further comprising:
 if the determined length is equal to the expected length, determining if all raw instruction bytes have been read from the prefetch buffer;
 if all raw instruction bytes have been read from the prefetch buffer,
  returning to the reading raw instruction bytes from the instruction cache, and
 if all raw instruction bytes have not been read from the prefetch buffer,
  returning to the reading raw instruction bytes from the prefetch buffer for storage in the bypass latches.

* * * * *